(12) United States Patent
Lu et al.

(10) Patent No.: US 11,338,264 B2
(45) Date of Patent: May 24, 2022

(54) FLUIDIZED BED COOLER WITH REGIONAL COORDINATION ENHANCEMENT

(71) Applicant: China University of Petroleum-Beijing, Beijing (CN)

(72) Inventors: Chunxi Lu, Beijing (CN); Jiantao Li, Beijing (CN); Xiuying Yao, Beijing (CN)

(73) Assignee: China University of Petroleum-Beijing, Beijing (CN)

( * ) Notice: Subject to any disclaimer, the term of this patent is extended or adjusted under 35 U.S.C. 154(b) by 0 days.

(21) Appl. No.: 17/153,180

(22) Filed: Jan. 20, 2021

(65) Prior Publication Data

US 2022/0055004 A1 Feb. 24, 2022

(30) Foreign Application Priority Data

Aug. 19, 2020 (CN) .......................... 202010835862.1

(51) Int. Cl.
*B01J 8/00* (2006.01)
*B01J 8/18* (2006.01)
(Continued)

(52) U.S. Cl.
CPC ........... *B01J 8/1827* (2013.01); *B01J 8/1836* (2013.01); *B01J 8/1881* (2013.01);
(Continued)

(58) Field of Classification Search
CPC ..... B01J 8/00; B01J 8/18; B01J 8/1818; B01J 8/1827; B01J 8/1836; B01J 8/1881; B01J 19/00; B01J 19/24; B01J 2208/00; B01J 2208/00008; B01J 2208/00017; B01J 2208/00106; B01J 2208/00115; B01J 2208/00132; B01J 2208/00743;
(Continued)

(56) References Cited

U.S. PATENT DOCUMENTS

| 4,958,680 A * | 9/1990 | Barnes | ................... B01J 8/1863 |
| | | | 165/104.16 |
| 5,343,939 A * | 9/1994 | Cetinkaya | ................ B01J 38/32 |
| | | | 165/104.16 |
| 9,044,727 B2 * | 6/2015 | Kulprathipanja | ..... F28D 7/1615 |

FOREIGN PATENT DOCUMENTS

CN 2457555 Y 10/2001
CN 2515637 Y 10/2002
(Continued)

*Primary Examiner* — Natasha E Young
(74) *Attorney, Agent, or Firm* — Westbridge IP LLC (57) ABSTRACT

The present disclosure discloses a fluidized bed cooler with regional coordination enhancement, comprising a shell, a catalyst inlet, an interior of the shell is divided into a catalyst inlet influence region, a dilute phase region, a dense phase region and a gas distributor influence region; a catalyst inlet inclined tube is provided obliquely upward at the catalyst inlet, and a regional particle distributor is provided at the catalyst inlet; the dense phase region is provided with a plurality of dense phase baffle plates, and the dilute phase region is provided with a plurality of dilute phase baffle plates; and the gas distributor influence region is provided with double gas distributors. The fluidized bed cooler simultaneously well solves the low internal stability and the low heat exchange efficiency of the fluidized bed cooler, thereby realizing the stable and efficient operation of the fluidized bed cooler.

18 Claims, 10 Drawing Sheets

(51) Int. Cl.
 *B01J 19/00* (2006.01)
 *B01J 19/24* (2006.01)
(52) U.S. Cl.
 CPC .............. *B01J 2208/0084* (2013.01); *B01J 2208/00132* (2013.01); *B01J 2208/00752* (2013.01); *B01J 2208/00893* (2013.01); *B01J 2208/00938* (2013.01)
(58) Field of Classification Search
 CPC .... B01J 2208/00752; B01J 2208/00796; B01J 2208/00823; B01J 2208/00831; B01J 2208/0084; B01J 2208/00893; B01J 2208/00938; B01J 2219/00; B01J 2219/24
 See application file for complete search history.

(56) References Cited

FOREIGN PATENT DOCUMENTS

| CN | 101769694 B | 5/2012 |
|----|-------------|--------|
| CN | 203928822 U | 11/2014 |
| CN | 103113914 B | 6/2017 |
| CN | 209197538 U | 8/2019 |
| CN | 109207187 B | 3/2020 |

\* cited by examiner

FLUIDIZED BED COOLER WITH REGIONAL COORDINATION ENHANCEMENT

CROSS-REFERENCE TO RELATED APPLICATIONS

This application claims priority to Chinese Patent Application No. 202010835862.1, filed on Aug. 19, 2020, entitled "FLUIDIZED BED COOLER WITH REGIONAL COORDINATION ENHANCEMENT", the disclosure of which is incorporated herein in its entirety by reference.

TECHNICAL FIELD

The present disclosure relates to a fluidized bed cooler, and in particular to a fluidized bed cooler with regional coordination enhancement.

BACKGROUND

In recent years, the crude oil in the world oil market has obviously become heavier, and the catalytic cracking technology for lightening heavy oil has attracted more and more attention. The catalytic cracking feedstock is becoming heavier and the coke yield is increasing, which causes excess heat in a reaction-regeneration system, and it is necessary to remove the excess heat in time to maintain the heat balance of the reaction-regeneration system. Therefore, it is very important to remove the excess heat carried by the catalyst from the reaction-regeneration system. A heavy oil catalytic cracking apparatus generally adopts an external cooler mounted outside a regenerator, which can remove the excess heat in the reaction-regeneration system without affecting the normal operation of the reaction-regeneration system.

A plurality of heat exchange tubes are usually provided inside a fluidized bed cooler to form a heat exchange tube bundle, and a flow of catalytic cracking solid particles in a shell is utilized to exchange heat with heat removing mediums in the heat exchange tubes. In addition, due to the difference between catalyst flow characteristics, the fluidized bed cooler may be divided into a catalyst inlet influence region, a dilute phase region at an upper portion, a dense phase region at a lower portion and a gas distributor influence region at a bottom portion.

At present, there are many patents for improving the heat exchange efficiency of the fluidized bed cooler. For example, Chinese patents No. CN2515637Y and CN2457555Y increase a local renewal frequency of catalyst particles by welding members in a form of nail heads as well as annular and inclined fin structures, on surfaces of the heat exchange tubes respectively, so as to improve the heat transfer efficiency. In Chinese patent "Improved Forced Inner Mixing Type Fluidized Bed Outer Cooler" with an application number of CN201420122076.7, two gas distributors are designed at a bottom portion of a fluidized bed cooler, wherein gas flow rates of the two gas distributors are controlled to enhance radial inner mixing of particles and improve heat exchanges in regions influenced by the distributors. In Chinese patent "Forced Inner Mixing Type External Cooler for Catalytic Cracking Catalyst" with an application number of 201010034467.X, a central gas distributor arranged in an axial central region inside a cooler and a peripheral gas distributor arranged in a sidewall region, which are provided at a bottom portion inside the cooler, are both annular tube gas distributors. In Chinese patent "Baffle Reinforced Fluidized Bed External Cooler" with an application number of 201821766593.2, a baffle is installed in a dense phase region, and a flow field at a shell section of the fluidized bed cooler is improved through a rectifying action of the baffle, so that the catalyst presents a flow condition of pseudo-spiral or pseudo-crossflow, which increases the residence time of the catalyst to be cooled and enhances the turbulent of the catalyst, thus enhancing the heat exchange process, while solving the problem of a large axial and radial temperature difference caused by a local de-fluidization of the catalyst.

There are also many patents for reducing the impact and wearing of the solid catalyst particles on the heat exchange tubes to improve the internal stability of the fluidized bed cooler. For example, in Chinese patent "External Catalytic Cracking Cooler with Pre-Distributable Particles" with an application number of 201310073633.0, an annular fluidized bed is designed at a catalyst inlet to alleviate the erosion of the solid particles on the heat exchange tubes. In Chinese patent "Solid Particle cooler Inlet Device" with an application number of 201811018125.1, the erosion of the inlet catalyst on the heat exchange tube bundle is weakened and the distribution uniformity of inlet catalyst is optimized by designing a decelerating plate and a rectifier plate, respectively.

However, the ideas of improving the heat exchange efficiency disclosed in the existing patent documents mainly focus on enhancing one local region selected from the heat exchange tubes, the catalyst inlet influence region, the dilute phase region, the dense phase region and the gas distributor influence region while neglecting the coordinated enhancement of a plurality of regions of the fluidized bed cooler as a whole, consequently the improvement of the heat exchange efficiency is liable to be limited. Moreover, there is still a problem that it is difficult to maintain a stable operation of the fluidized bed cooler due to the impact and wearing of the solid catalyst particles in the catalyst inlet influence region to the heat exchange tubes, which problem hasn't been solved fundamentally. The above problems not only restrict the significant improvement of the heat transfer efficiency, but also affect the stability of the working state of the fluidized bed cooler.

SUMMARY

An objective of the present disclosure is to provide a fluidized bed cooler with regional coordination enhancement, so as to solve the problems that the improvement of the heat exchange efficiency is limited due to the enhancement of local regions, and the internal stability of the fluidized bed cooler is decreased due to the impact and wearing of the solid catalyst particles on the heat exchange tubes, thereby realizing the stable and efficient operation inside the fluidized bed cooler.

The present disclosure provides a fluidized bed cooler with regional coordination enhancement, comprising a shell which is cylindrical and vertically provided, a plurality of heat exchange tubes are vertically distributed in the shell, a catalyst inlet is provided at an upper portion of the shell, a catalyst outlet is provided at a bottom portion of the shell, and an interior of the shell is divided into a catalyst inlet influence region, a dilute phase region at the upper portion, a dense phase region at a lower portion and a gas distributor influence region at the bottom portion, wherein the dilute phase region and the dense phase region are located above and below the catalyst inlet influence region, respectively; a catalyst inlet inclined tube is provided obliquely upward at the catalyst inlet, and a regional particle distributor is provided at the catalyst inlet positioned in the catalyst inlet inclined tube; the regional particle distributor comprises a local gas distribution plate, a local gas pre-distributor, a left splitter partition plate and a right splitter partition plate; the local gas distribution plate is provided with a plurality of local gas distribution plate vent holes at intervals, the local gas pre-distributor is a closed space formed by the local gas distribution plate, a support plate and the catalyst inlet inclined tube, inner ends of the left splitter partition plate and the right splitter partition plate are fixedly connected to each other to form a partition plate included angle, bottom portions of the left splitter partition plate and the right splitter partition plate are fixed on the local gas distribution plate, and the partition plate included angle is inside the local gas distribution plate, with outer ends of the left splitter partition plate and the right splitter partition plate extending beyond two ends of the local gas distribution plate, respectively; the local gas distribution plate is provided at a junction of the catalyst inlet inclined tube and the shell and is inclined upward towards the interior of the shell; and a lower portion of the catalyst inlet inclined tube is provided with a local fluidizing air inlet at a position directly opposite to the local gas distribution plate, so that fluidizing air can enter the local gas pre-distributor; the dense phase region is provided with a plurality of dense phase baffle plates, the dilute phase region is provided with a plurality of dilute phase baffle plates, both the dense phase baffle plate and the dilute phase baffle plate are provided with guide holes, and the plurality of heat exchange tubes sequentially pass through and are fixedly connected to the plurality of dense phase baffle plates and the plurality of dilute phase baffle plates vertically arranged at intervals so as to form a single piece; and the gas distributor influence region is provided with double gas distributors.

Preferably, the local gas distribution plate is shaped as a sector of 180°, and the plurality of local gas distribution plate vent holes on the local gas distribution plate are symmetrically distributed about a centerline of the local gas distribution plate; the left splitter partition plate and the right splitter partition plate are both provided with a plurality of partition plate vent holes, wherein the left splitter partition plate and its partition plate vent holes and the right splitter partition plate and its partition plate vent holes are symmetrical about a vertical section where the centerline of the local gas distribution plate is located, respectively.

Preferably, a sharp corner at a top portion of the partition plate included angle is slotted to form a middle channel for facilitating the flow of the fluidized catalyst particles.

Preferably, each of the heat exchange tubes comprises a water tube and a steam tube hermetically sleeving the water tube, a top end of each of the heat exchange tubes extends outside the shell, a water inlet is provided at a top portion of the water tube, and a steam outlet is provided at a top portion of the steam tube; and the plurality of heat exchange tubes in parallel form a heat exchange tube bundle.

Preferably, the double gas distributors comprise a central gas distributor and an annulus gas distributor, both of which are annular tubes, wherein an outer diameter of the central gas distributor is smaller than the inter diameter of the annulus gas distributor, the central gas distributor and the annulus gas distributor are provided in parallel at the bottom portion inside the shell below the heat exchange tube bundle, and the central gas distributor is located below the annulus gas distributor; each of the central gas distributor and the annulus gas distributor is provided with a fluidizing air inlet, a bottom surface of the central gas distributor is circumferentially provided with a plurality of central gas distributor vent holes at intervals, a bottom surface of the annulus gas distributor is circumferentially provided with a plurality of annulus gas distributor vent holes at intervals, the fluidizing air inlet of the central gas distributor is communicated with the plurality of central gas distributor vent holes, and the fluidizing air inlet of the annulus gas distributor is communicated with the plurality of annulus gas distributor vent holes; a central fluidizing air inlet and an annulus fluidizing air inlet are provided on the shell at positions corresponding to the central gas distributor and the annulus gas distributor, respectively, and are communicated with the fluidizing air inlet of the central gas distributor and the fluidizing air inlet of the annulus gas distributor, respectively.

Preferably, the central gas distributor vent hole is inclined towards a longitudinal centerline of the shell, so that fluidizing air from the central gas distributor vent hole flows to a center of the shell 1 as much as possible; the annulus gas distributor vent hole is inclined towards an inner wall of the shell, so that fluidizing air from the annulus gas distributor vent hole flows to a circumference of the inner wall of the shell as much as possible.

Preferably, the dense phase baffle plate is a bent plate in structure with a fold-line shaped or arc-shaped longitudinal section, and provided with a plurality of dense phase baffle plate guide holes; in the dense phase region, the plurality of dense phase baffle plates are spirally arranged from bottom to top around a longitudinal centerline of the shell or arranged in a staggered manner from bottom to top along the longitudinal centerline of the shell.

Preferably, the dilute phase baffle plate is a cone frustum in structure, comprising an upper frustum circular hole, a lower frustum circular hole and a frustum body, the upper frustum circular hole and the lower frustum circular hole are connected through the frustum body, and the frustum body is provided with a plurality of dilute phase baffle plate guide holes; the plurality of dilute phase baffle plates are located in the dilute phase region, centerlines of the dilute phase baffle plates are coincided with a longitudinal centerline of the shell, and one of adjacent dilute phase baffle plates is arranged upside-down with respect to the other of the adjacent dilute phase baffle plates along the longitudinal centerline of the shell so that the upper frustum circular hole and the lower frustum circular hole of the adjacent dilute phase baffle plates are arranged in a staggered manner.

Preferably, the dilute phase baffle plate is a bent plate in structure with a fold-line shaped or arc-shaped longitudinal section, and provided with a plurality of dilute phase baffle plate guide holes; in the dilute phase region, the plurality of dilute phase baffle plates are spirally arranged from bottom to top around a longitudinal centerline of the shell or arranged in a staggered manner from bottom to top along the longitudinal centerline of the shell.

The present disclosure has the following advantageous effects:

In the fluidized bed cooler with regional coordination enhancement disclosed by the present disclosure, after flowing in from the local fluidizing air inlet, the fluidizing air can stably and uniformly pass through the plurality of local gas distribution plate vent holes on the local gas distribution plate due to the existence of the local gas pre-distributor, thereby fluidizing the solid catalyst particles flowing in from the catalyst inlet inclined tube, and the solid catalyst particles will flow into the shell through both outer sides of the left splitter partition plate and the right splitter partition plate. Due to the existence of the regional particle distributor, the solid catalyst particles are distributed more uniformly after entering the shell from the catalyst inlet inclined tube, and the flow velocity decreases, thereby weakening the impact and wearing of the solid catalyst particles on the heat exchange tubes and optimizing the uniform distribution of the catalyst particles, which not only improves the distribution uniformity of the solid catalyst particles on the windward and leeward sides of the heat exchange tube, but also helps to improve the thermal distribution uniformity and the mechanical stability around the heat exchange tubes in the shell, so as to improve the internal stability of the fluidized bed cooler.

Secondly, the regional particle distributor coordinates together with the dilute phase baffle plates, the dense phase baffle plates and the double gas distributors to enhance the heat exchange procedure of the whole cooler, and greatly improve the heat exchange efficiency, in which the dense phase baffle plates can enhance the lateral or radial movement of the solid catalyst particles, change the flow path of the solid catalyst particles, and increase the total residence time of the solid catalyst particles. Through the cooperation of the dense phase baffle plates and the double gas distributors, it is possible to realize the coordination enhancement of the gas-solid interaction and the action of the dense phase baffle plates, and enhance the renewal frequency of the solid catalyst particles on the surface of heat exchange tube bundle and a time fraction of the solid catalyst particles occupying the surface, thereby enhancing the heat exchange in the whole dense phase region to the greatest extent. The dilute phase baffle plates can enhance the interaction between the particles and the gas, change the flow directions of the gas and the particles, and enhance their radial motion, thereby increasing the time fraction and the renewal frequency of the solid catalyst particles occupying the surface and enhancing the heat exchange of the dilute phase.

To sum up, the fluidized bed cooler with regional coordination enhancement disclosed by the present disclosure simultaneously well solves the problems that the internal stability of the fluidized bed cooler is low due to the wearing and impact of the inlet catalysts on the heat exchange tube bundle, and the heat exchange efficiency is low because the improvement of the heat exchange efficiency is limited due to the enhancement of local regions, thereby realizing the stable and efficient operation of the fluidized bed cooler.

BRIEF DESCRIPTION OF THE DRAWINGS

FIGS. 4a to 4c are structural diagrams of a regional particle distributor provided by Embodiment 1 of the present disclosure, wherein

FIGS. 5a and 5b are structural diagrams of a central gas distributor provided by Embodiment 1 of the present disclosure, wherein

FIGS. 6a and 6b are structural diagrams of an annulus gas distributor provided by Embodiment 1 of the present disclosure, wherein

FIGS. 7a and 7b are structural diagrams of a dense phase region baffle plate provided by Embodiment 1 of the present disclosure, wherein

FIGS. 8a and 8b are structural diagrams of a dilute phase region baffle plate provided by Embodiment 1 of the present disclosure, wherein

FIGS. 10a and 10b are structural diagrams of a fold-line shaped bent plate provided by Embodiment 2 of the present disclosure, wherein

DESCRIPTION OF THE REFERENCE NUMERALS

1—shell; 11—catalyst inlet inclined pipe; 12—catalyst outlet; 2—heat exchange tube bundle; 20—heat exchange tube; 201—water tube; 202—steam tube; 21—water inlet; 22—steam outlet; 3—regional particle distributor; 30—local gas distribution plate vent hole; 31—local gas distribution plate; 32—left splitter partition plate; 33—right splitter partition plate; 34—partition plate vent hole; 35—middle channel; 4—dilute phase baffle plate; 40—dilute phase baffle plate guide hole; 41—upper frustum circular hole; 42—lower frustum circular hole; 5—dense phase baffle plate; 50—dense phase baffle plate guide hole; 6—fluidizing air inlet; 7—central gas distributor; 70—central gas distributor vent hole; 8—annulus gas distributor; 80—annulus gas distributor vent hole; A1—central fluidizing air inlet; A2—annulus fluidizing air inlet; A3—local fluidizing air inlet; M—dilute phase region; N—dense phase region; L—liquid water; g—gas steam.

DETAIL DESCRIPTION OF THE PREFERRED EMBODIMENTS

Embodiment 1

Embodiment 1 provides a fluidized bed cooler with regional coordination enhancement, and a structure thereof will be described in detail below.

Figure 1:
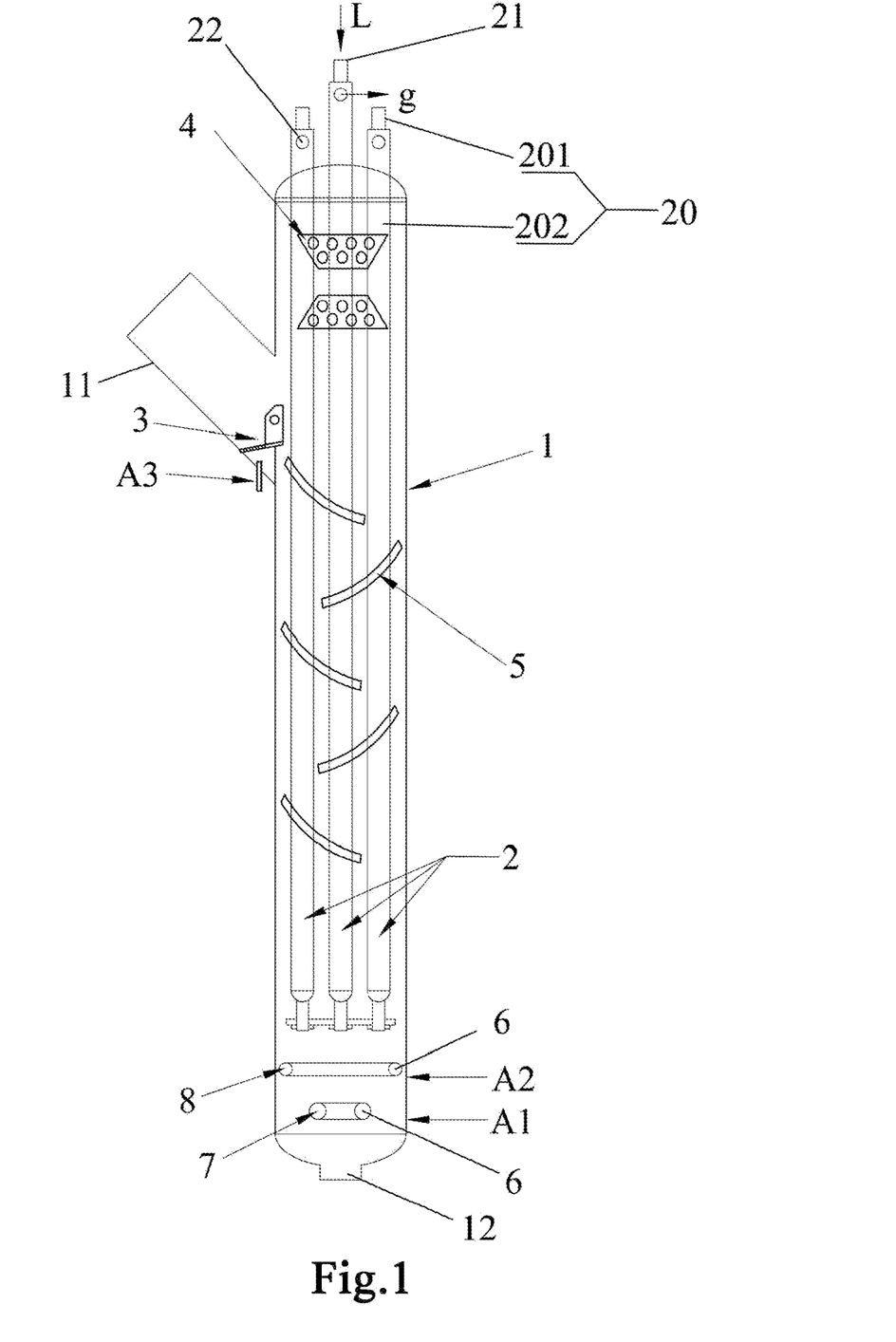
FIG. 1 is a structural diagram of a fluidized bed cooler with regional coordination enhancement provided by Embodiment 1 of the present disclosure.
Figure 2:
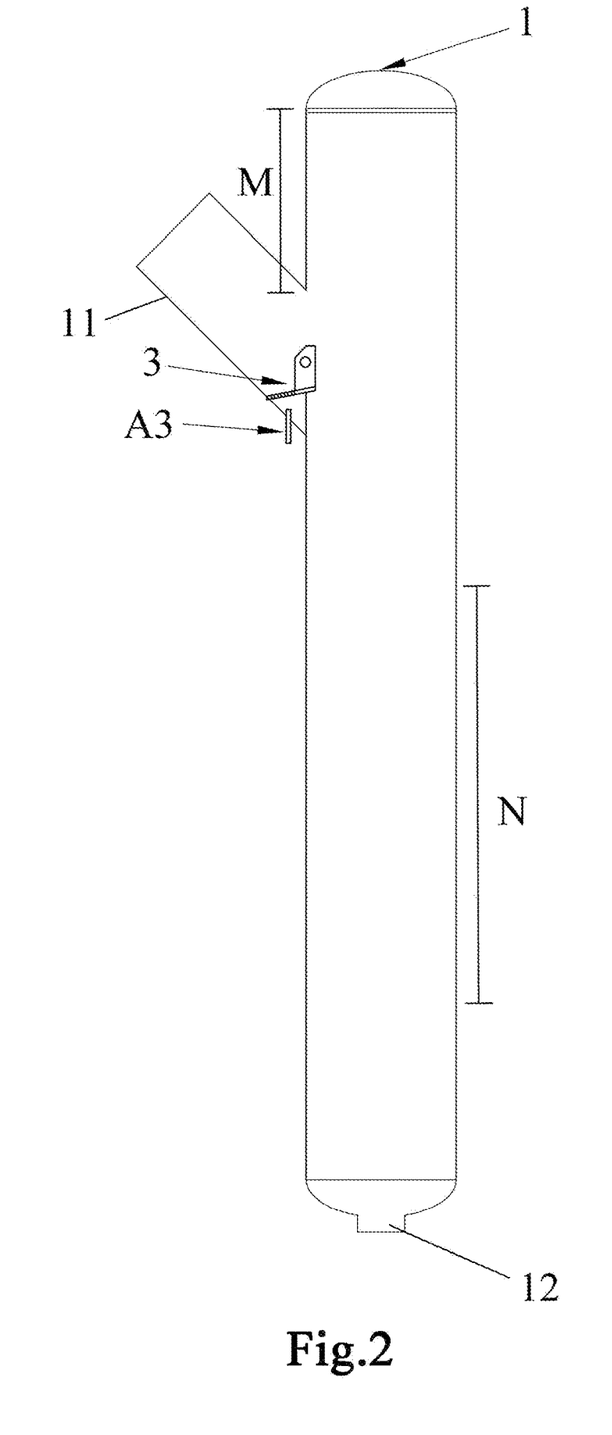
FIG. 2 is a distribution diagram of a dilute phase region and a dense phase region provided by Embodiment 1 of the present disclosure.

With reference to FIGS. 1 and 2, the fluidized bed cooler comprises a shell 1 which is cylindrical and vertically arranged. A plurality of heat exchange tubes 20 are vertically distributed in the shell 1. A catalyst inlet is provided at an upper portion of the shell 1, and a catalyst outlet 12 is provided at a bottom portion of the shell 1. An interior of the shell 1 is divided into a catalyst inlet influence region, a dilute phase region M at the upper portion, a dense phase region N at a lower portion and a gas distributor influence region at the bottom portion; wherein the dilute phase region M and the dense phase region N are located above and below the catalyst inlet influence region, respectively. A catalyst inlet inclined tube 11 is provided obliquely upward at the catalyst inlet, and a regional particle distributor 3 is provided at the catalyst inlet positioned in the catalyst inlet inclined tube 11; the dense phase region N and the catalyst inlet influence region are provided with a plurality of dense phase baffle plates 5, while the dilute phase region M is provided with a plurality of dilute phase baffle plates 4, both the dense phase baffle plate 5 and the dilute phase baffle plate 4 are provided with guide holes. A plurality of heat exchange tubes 20 sequentially pass through the plurality of dense phase baffle plates 5 and the plurality of dilute phase baffle plates 4 vertically arranged at intervals, and are firmly connected to each other as a whole. The gas distributor influence region is provided with double gas distributors.

With reference to FIGS. 3 and 4a to 4c, the regional particle distributor 3 comprises a local gas distribution plate 31, a left splitter partition plate 32 and a right splitter partition plate 33; a closed space formed by the local gas distribution plate 31, the catalyst inlet inclined tube 11 and a support plate 111 constitutes a local gas pre-distributor. The local gas distribution plate 31 is provided with a plurality of local gas distribution plate vent holes 30 at intervals, the inner ends of the left splitter partition plate 32 and the right splitter partition plate 33 are fixedly connected so as to form a partition plate included angle, and the bottom portions of the left splitter partition plate 32 and the right splitter partition plate 33 are fixed on the local gas distribution plate 31, wherein the partition plate included angle is inside the local gas distribution plate 31, with outer ends of the left splitter partition plate 32 and the right splitter partition plate 33 extending beyond two ends of the local gas distribution plate 31, respectively. The local gas distribution plate 31 is provided at a junction of the catalyst inlet inclined tube 11 and the shell 1 and inclined upward towards the interior of the shell 1; and a lower portion of the catalyst inlet inclined tube 11 is provided with a local fluidizing air inlet A3 at a position directly opposite to the local gas distribution plate 31.

Figure 3:
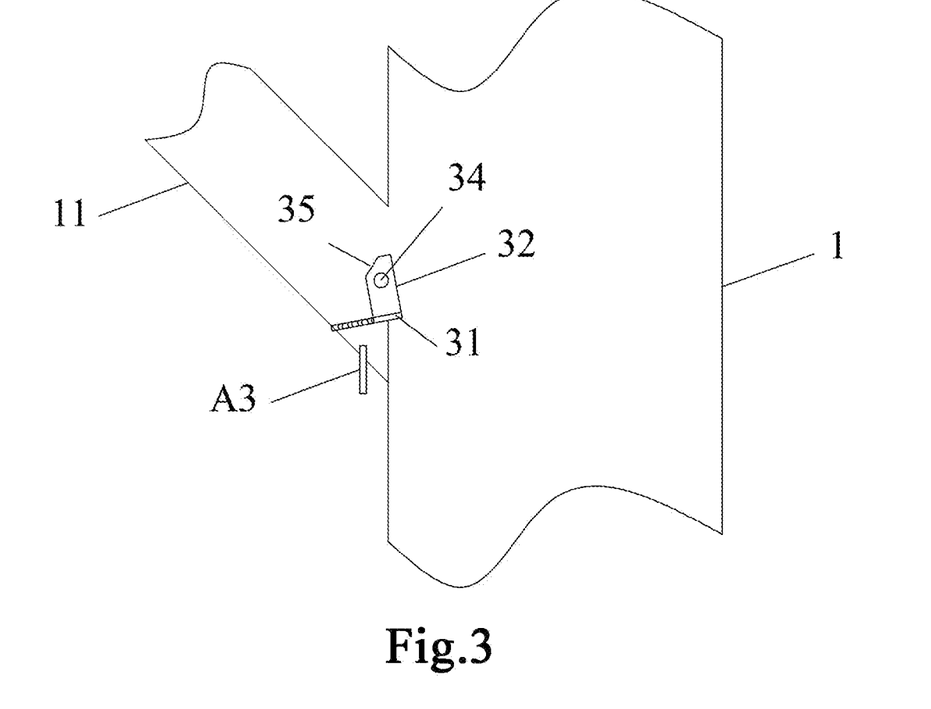
FIG. 3 is an enlarged diagram of a regional particle distributor in a catalyst inlet influence region in a catalyst inlet inclined tube provided by Embodiment 1 of the present disclosure.

After flowing in from the local fluidizing air inlet A3, the fluidizing air can stably and uniformly pass through the plurality of local gas distribution plate vent holes 30 on the local gas distribution plate 31 due to the existence of the local gas pre-distributor, thereby fluidizing the solid catalyst particles flowing in from the catalyst inlet inclined tube 11, and the solid catalyst particles can flow into the shell 1 through both outer sides of the left splitter partition plate 32 and the right splitter partition plate 33.

Figure 4A:
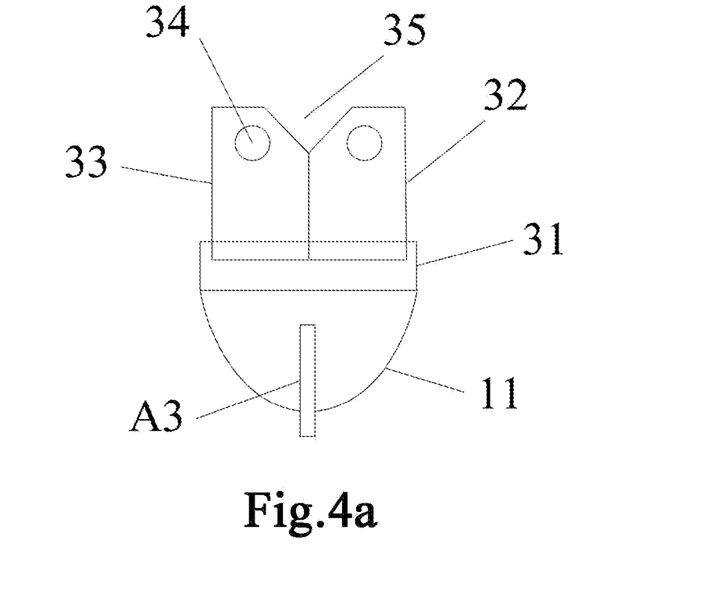
FIG. 4a is a front view of a regional particle distributor provided by Embodiment 1 of the present disclosure.
Figure 4B:
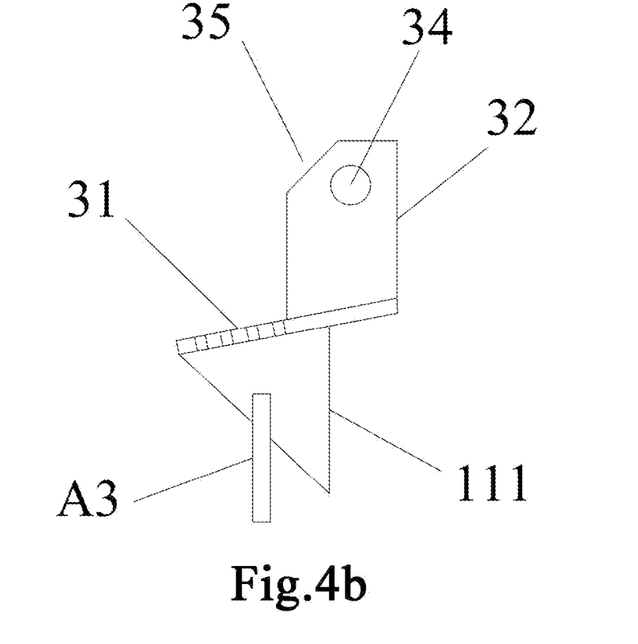
FIG. 4b is a side view of a regional particle distributor provided by Embodiment 1 of the present disclosure.
Figure 4C:
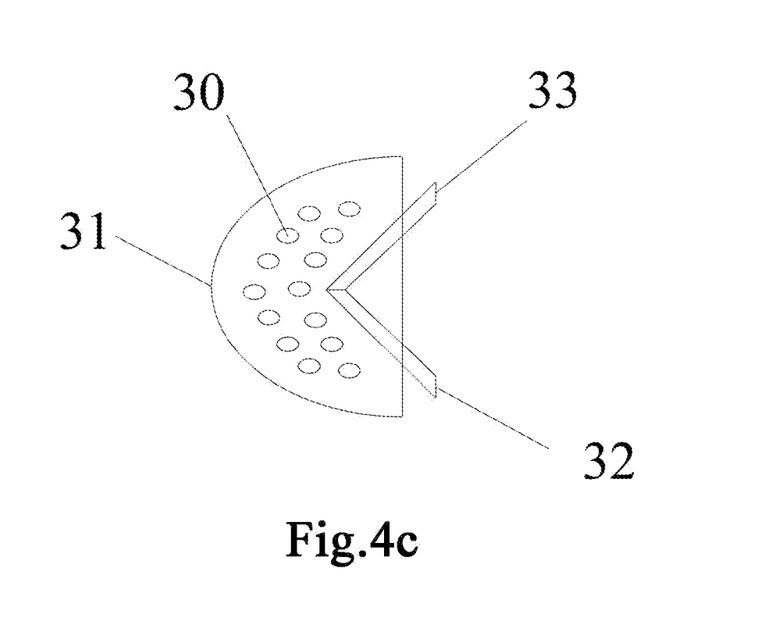
FIG. 4c is a top view of a regional particle distributor provided by Embodiment 1 of the present disclosure.

Further referring to FIGS. 4a to 4c, the local gas distribution plate 31 is shaped as a sector of 180°, and the plurality of local gas distribution plate vent holes 30 on the local gas distribution plate 31 are symmetrically distributed about a centerline of the local gas distribution plate 31. The left splitter partition plate 32 and the right splitter partition plate 33 are both provided with a plurality of partition plate vent holes 34, wherein the left splitter partition plate 32 (and the partition plate vent holes 34 thereof) and the right splitter partition plate 33 (and the partition plate vent holes 34 thereof) are symmetrical about a vertical section where the centerline of the local gas distribution plate 31 is located.

After flowing in from the local fluidizing air inlet A3, the fluidizing air can stably and uniformly pass through the plurality of local gas distribution plate vent holes 30 on the local gas distribution plate 31 due to the existence of the local gas pre-distributor, thereby fluidizing the solid catalyst particles flowing in from the catalyst inlet inclined tube 11, and the solid catalyst particles can flow into the shell 1 through both outer sides of the left splitter partition plate 32 and the right splitter partition plate 33, as well as through the partition plate vent holes 34 of the left splitter partition plate 32 and the right splitter partition plate 33. The two plate vent holes 34 enhance the circulation of the catalyst particles in the regional particle distributor 3, and the plurality of local gas distribution plate vent holes 30, the left splitter partition plate 32 and the right splitter partition plate 33 which are symmetrically arranged further improve the distribution uniformity of the solid catalyst particles.

In order to further enhance the distribution uniformity of the solid catalyst particles and the circulation for passing through the left splitter partition plate 32 and the right splitter partition plate 33, a sharp corner at a top portion of the partition plate included angle is slotted to form a middle channel 35 for facilitating the flow of the fluidized catalyst particles. The middle channel 35 and the partition plate vent holes 34 on both sides thereof, and the both outer sides of the left splitter partition plate 32 and the right splitter partition plate 33 together form five channels for the solid catalyst particles to pass through the left splitter partition plate 32 and the right splitter partition plate 33, thereby achieving the effect of increasing the distribution uniformity of the solid catalyst particles.

In order to ensure that the solid catalyst particles are in a fluidized state, reduce the flow velocity of the solid catalyst particles, and weaken the erosion and wearing of the solid catalyst particles on the heat exchange tube bundle 2, the solid catalyst particles are subjected to the action of the local fluidizing air inlet A3 when passing through the local gas distribution plate 31, and then its flow type and flow velocity are changed when passing through the left splitter partition plate 32 and the right splitter partition plate 33, so that the decelerated solid catalyst particles are distributed as uniformly as possible in the catalyst inlet influence region. Therefore, due to the effect of the region particle distributor 3, the solid catalyst particles are distributed more uniformly after entering the shell 1 from the catalyst inlet inclined tube 11, and the flow velocity thereof is reduced.

Specifically, the local gas distribution plate 31 is provided in an angle greater 0° and less than or equal to 30°, and preferably 15°, relative to the horizontal direction.

The local gas distribution plate vent hole 30 is circular with an aperture ratio of 1% to 10%, and an inclination angle from the normal direction of the local gas distribution plate vent hole 30 to the local gas distribution plate 31 is 45° to 90°, and preferably 90°.

Further, an included angle between the left splitter partition plate 32 or the right splitter partition plate 33 and the local gas distribution plate 31 is 90° to 120°, and preferably 90°.

Preferably, the left splitter partition plate 32 and the right splitter partition plate 33 have the same height, and a slotted depth of the middle channel 35 is 15% to 50%, and preferably 40% of a height of the left splitter partition plate 32 and the right splitter partition plate 33.

An aperture ratio of the partition plate vent holes 34 of the left splitter partition plate 32 and the right splitter partition plate 33 is 0.5% to 5%.

Wear-resistant linings are laid or wear-resistant cemented carbide coatings are coated on the surfaces of the local gas distribution plate 31, the left splitter partition plate 32 and the right splitter partition plate 33.

With further reference to FIG. 1, each of the heat exchange tubes 20 comprises a water tube 201 and a steam tube 202 hermetically sleeving the water tube 201, a top end of each of the heat exchange tubes 20 extends outside the shell 1, a water inlet 21 is provided at a top portion of the water tube 201, and a steam outlet 22 is provided at a top portion of the steam tube 202; and the plurality of heat exchange tubes 20 in parallel to each other form a heat exchange tube bundle 2. Liquid water L is introduced from the water inlet 21 of the tube 201, transformed into gas steam "g" after a heat exchange with the solid catalyst particles flowing from the catalyst inlet inclined pipe 11 to shell, and the gas steam "g" flows out from the steam outlet 22 of the tube 202.

With reference to FIGS. 5a, 5b, 6a, 6b and 1, the gas distributors comprise a central gas distributor 7 and an annulus gas distributor 8, both of which are annular tube structures, wherein an outer diameter of the central gas distributor 7 is smaller than the inter diameter of the annulus gas distributor 8. The central gas distributor 7 and the annulus gas distributor 8 are provided in parallel at the bottom portion inside the shell 1 below the heat exchange tube bundle 2, and the central gas distributor 7 is located below the annulus gas distributor 8. Each of the central gas distributor 7 and the annulus gas distributor 8 is provided with a fluidizing air inlet 6. A bottom surface of the central gas distributor 7 is circumferentially provided with a plurality of central gas distributor vent holes 70 at intervals, and a bottom surface of the annulus gas distributor 8 is circumferentially provided with a plurality of annulus gas distributor vent holes 80 at intervals. The fluidizing air inlet 6 of the central gas distributor 7 is communicated with the plurality of central gas distributor vent holes 70, and the fluidizing air inlet 6 of the annulus gas distributor 8 is communicated with the plurality of annulus gas distributor vent holes 80.

A central fluidizing air inlet A1 and an annulus fluidizing air inlet A2 are provided on the shell 1 at positions corresponding to the central gas distributor 7 and the annulus gas distributor 8, respectively, and are communicated with the fluidizing air inlet 6 of the central gas distributor 7 and the fluidizing air inlet 6 of the annulus gas distributor 8, respectively.

In order to control a circulation direction of fluidizing air to achieve a better circulation effect, the central gas distributor vent hole 70 is inclined towards a longitudinal centerline of the shell 1, so that fluidizing air from the central gas distributor vent hole 70 flows to a center of the shell 1 as much as possible, and the annulus gas distributor vent hole 80 is inclined towards an inner wall of the shell 1, so that fluidizing air from the annulus gas distributor vent hole 80 flows to a circumference of the inner wall of the shell 1 as much as possible.

Figure 5A:
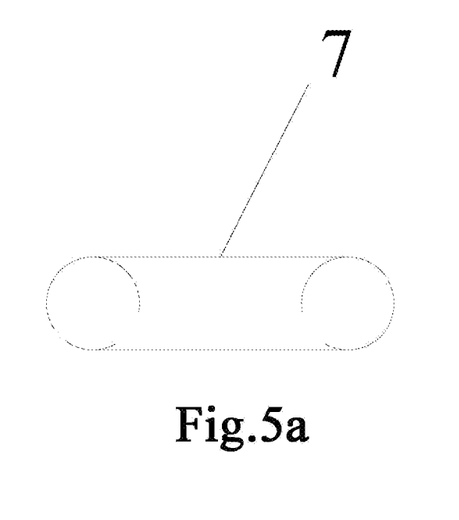
FIG. 5a is a side view of a center gas distributor.
Figure 5B:
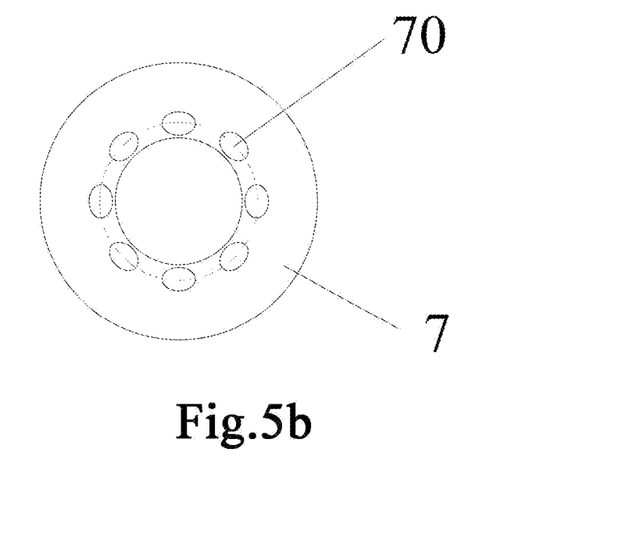
FIG. 5b is a bottom view of a center gas distributor.

Specifically, an included angle between a normal direction of the central gas distributor vent hole 70 and a horizontal direction is 10° to 45°, and preferably 15°.

Figure 6A:
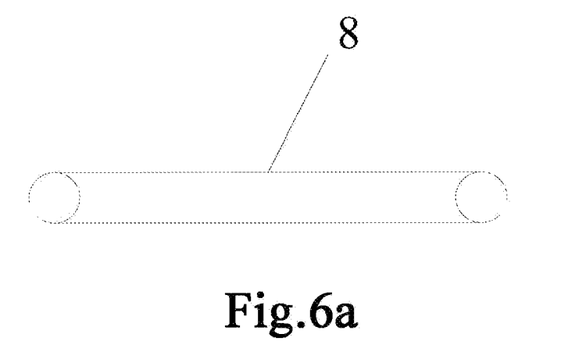
FIG. 6a is a side view of an annulus gas distributor.
Figure 6B:
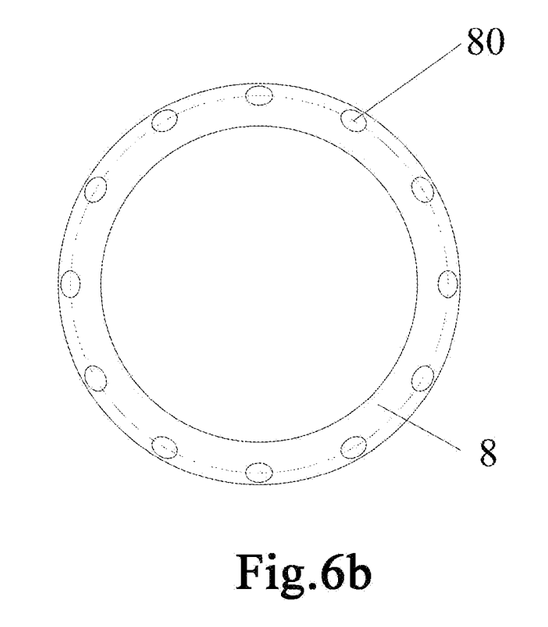
FIG. 6b is a bottom view of an annulus gas distributor.

An included angle between a normal direction of the annulus gas distributor vent hole 80 and the horizontal direction is 30° to 90°, and preferably 60°.

A vertical distance between the central gas distributor 7 and the annulus gas distributor 8 is 0.3 m to 1.0 m.

Figure 7A:
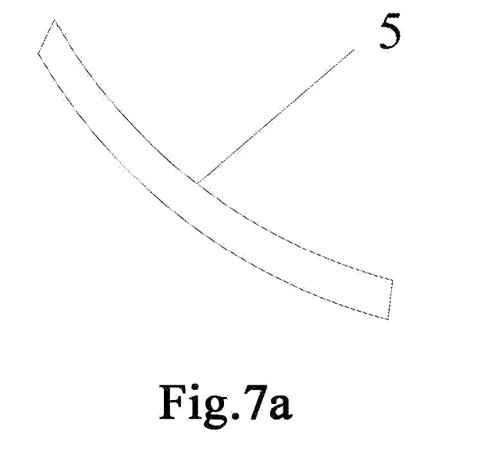
FIG. 7a is a side view of a dense phase region baffle plate.
Figure 7B:
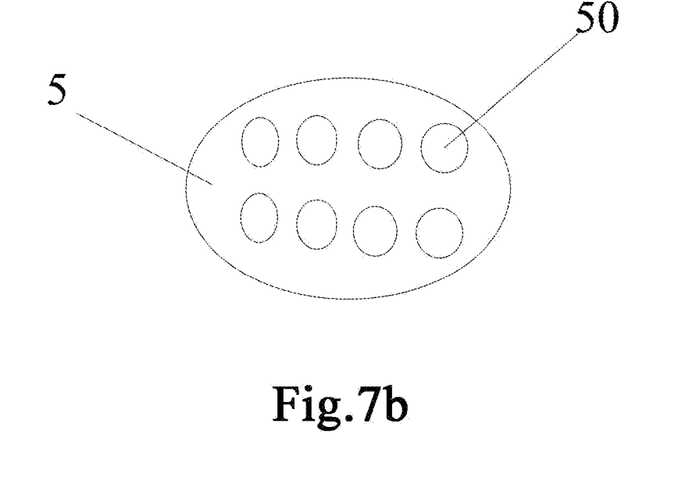
FIG. 7b is a top view of a dense phase region baffle plate.

In order that the solid catalyst particles can flow along the dense phase baffle plates, a flow path of the solid catalyst particles can be extended, a total residence time of the solid catalyst particles can be increased, and the dense phase region N can be enhanced, a plurality of dense phase baffle plates 5 are provided in the dense phase region N. With reference to FIGS. 7a and 7b, the dense phase baffle plate 5 is a bent plate structure with an arc-shaped longitudinal section, and provided with a plurality of dense phase baffle plate guide holes 50. In the dense phase region N, the plurality of dense phase baffle plates 5 are spirally arranged from bottom to top around the longitudinal centerline of the shell 1 or arranged in a staggered manner from bottom to top along the longitudinal centerline of the shell 1, as illustrated in FIG. 1.

The arc-shaped inclination of the dense phase baffle plate 5 helps to promote the radial motion of the solid catalyst particles, prevents the solid catalyst particles in the dense phase region from leaving from a particle outlet at the bottom portion without exchanging heat with the heat exchange tube bundle 2, while increasing the renewal of the solid catalyst particles on the surface of the heat exchange tube bundle 2. In addition, the inclination angle is larger than a stacking angle of the solid catalyst particles, which prevents a low heat exchange efficiency of a local dense phase bed caused by the stacking of the solid catalyst particles on the surface thereof.

It should be noted that the dense phase baffle plate 5 keeps a certain distance from the double gas distributors which are capable of utilizing a gas-solid interaction to enhance the renewal frequency of the solid catalyst particles on the heat exchange surface of the heat exchange tube bundle 2, while the existence of the dense phase baffle plates 5 will weaken the effect of the double gas distributors. Therefore, the dense phase baffle plate 5 cannot be provided in the gas distributor influence region, in order to realize their coordinated enhancement of the heat exchange and further enhance the heat exchange in the dense phase region N. Meanwhile, the dense phase baffle plates 5 are also provided in an inlet region of the solid catalyst particles according to the flow type of the solid catalyst particles in the inlet region, thereby ensuring a coordination between the inlet region and the dense phase region.

The dense phase baffle plate 5 is provided obliquely relative to the horizontal direction. Specifically, an angle between the dense phase baffle plate 5 and the horizontal direction is 30° to 60°, and preferably 45°, with a radian of 120° to 150°, and preferably 150°. A vertical distance between the adjacent dense phase baffle plates 5 is 0.3 m to 1.0 m, and preferably 1.0 m, and a distance between a lowest dense phase baffle plate 5 and the central gas distributor 7 is 0.8 m to 1.5 m, and preferably 1 m. The plurality of dense phase baffle plate guide holes 50 on the dense phase baffle plate 5 are circular, elliptical, square or triangular, and account for 5% to 40% of a projected area of the baffle plate.

Figure 8A:
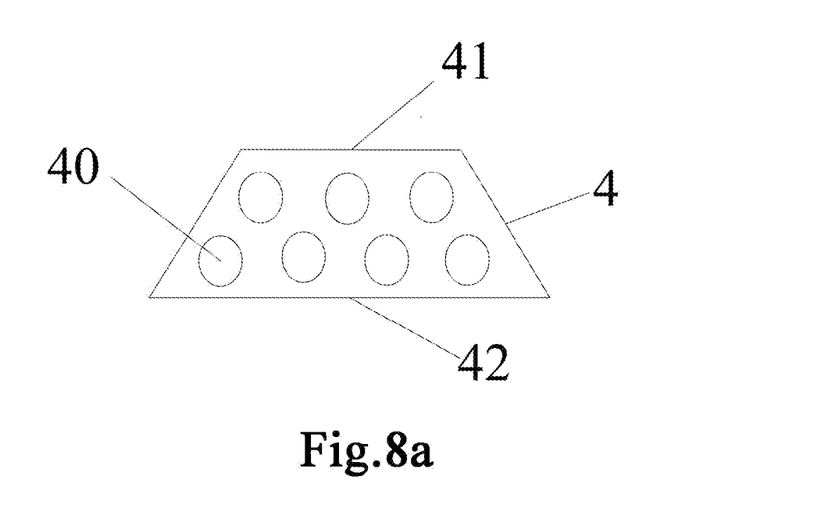
FIG. 8a is a side view of a dilute phase region baffle plate.
Figure 8B:
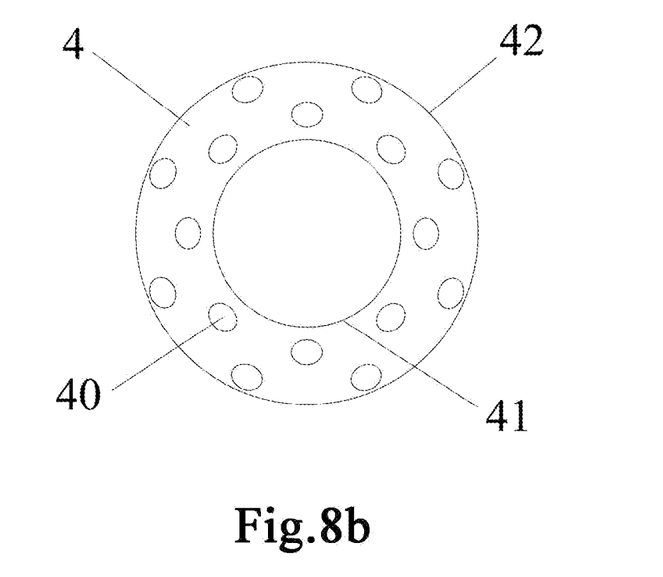
FIG. 8b is a top view of a dilute phase region baffle plate.

In order to further enhance the interaction between the solid catalyst particles and the gas, the flow directions of the gas and the solid catalyst particles are changed to enhance the radial motions thereof, thereby increasing the time fraction and the renewal frequency of the solid catalyst particles occupying the surface and improving the heat exchange efficiency in the dilute phase region M which is provided with a plurality of dilute phase baffle plates 4.

In a specific embodiment, with reference to FIGS. 8a and 8b, the dilute phase baffle plate 4 is a cone frustum in structure, comprising an upper frustum circular hole 41, a lower frustum circular hole 42 and a frustum body. The upper frustum circular hole 41 and the lower frustum circular hole 42 are connected through the frustum body, and the frustum body is provided thereon with a plurality of dilute phase baffle plate guide holes 40. The plurality of dilute phase baffle plates 4 are located in the dilute phase region M, and the centerlines of the dilute phase baffle plates 4 are coincided with the longitudinal centerline of the shell 1. One of the adjacent dilute phase baffle plates 4 is arranged upside-down with respect to the other of the adjacent dilute phase baffle plates 4 along the longitudinal centerline of the shell 1 so that the upper frustum circular hole 41 and the lower frustum circular hole 42 of the adjacent dilute phase baffle plates 4 are arranged in a staggered manner, as illustrated in FIG. 1.

Specifically, the aperture ratio of the plurality of dilute phase baffle plate guide holes 40 on the frustum body of the dilute phase baffle plate 4 is 5% to 40%, and preferably 10%, a vertical distance between the adjacent dilute phase baffle plates 4 is 0.3 m to 1.0 m, and preferably 0.5 m, and a distance between a highest dilute phase baffle plate 4 and a top portion of the shell 1 is 0.5 m to 1.0 m, and preferably 1.0 m.

In actual productions, in order to facilitate the connections from the dilute phase baffle plate 4 and the dense phase baffle plate 5 to the heat exchange tube bundle 2, through holes for the heat exchange tubes 20 to pass through are formed on the dilute phase baffle plate 4 and the dense phase baffle plate 5. In order to enhance the local particle renewal frequency and prevent an excessive pressure drop, the aperture ratio of the guide holes provided on the dilute phase baffle plate 4 and the dense phase baffle plate 5 for the catalyst to pass through is 5% to 40%.

The plurality of heat exchange tubes 20 are provided to pass through and be fixedly connected to the plurality of dilute phase baffle plates 4 and the plurality of dense phase baffle plates 5 so as to form a single piece.

It should be pointed out that, firstly, due to the existence of the regional particle distributor 3, the solid catalyst particles are distributed more uniformly after entering the shell 1 from the catalyst inlet inclined tube 11, and the flow velocity decreases, which not only improves the distribution uniformity of the solid catalyst particles on the windward and leeward sides of the heat exchange tube 20, but also helps to improve the thermal distribution uniformity and the mechanical stability around the heat exchange tubes 20 in the shell 1. Secondly, the regional particle distributor 3 coordinates together with the dilute phase baffle plates 4, the dense phase baffle plates 5 and the double gas distributors to enhance the heat exchange procedure of the whole cooler, in which the dense phase baffle plates 5 can promote the radial motion of the solid catalyst particles, prevent the solid catalyst particles in the dense phase region N from leaving from the catalyst outlet 12 at the bottom portion without exchanging heat with the heat exchange tube bundle 2, while increasing the renewal of the solid catalyst particles on the surface of the heat exchange tube bundle 2; the inclined arrangement inhibits the local stacking of the solid catalyst particles. The double gas distributors can utilize the gas-solid interaction to enhance the renewal frequency of the solid catalyst particles on the surface of the heat exchange tube bundle 2, and the matching of the double gas distributors with the dense phase baffle plates 5 can realize a coordinated enhancement of the heat exchange procedure in the dense phase region N to the greatest extent. The dilute phase baffle plates 4 enhance the interaction between the solid catalyst particles and the gas, change the flow directions of the gas and the solid catalyst particles, and enhance the radial motion thereof, thereby increasing the time fraction and the renewal frequency of the solid catalyst particles occupying the surface, and enhancing the heat exchange in the dilute phase region M. Therefore, in Embodiment 1, a precise regional enhancement is carried out for the catalyst inlet influence region, the dense phase region N, the dilute phase region M and the gas distributor influence region of the fluidized bed cooler, while a coordinated matching between various regions is realized, thereby enhancing the overall heat exchange performance and stability of the fluidized bed cooler to the greatest extent.

Embodiment 2

On the basis of Embodiment 1, Embodiment 2 provides another structural form of the dilute phase baffle plate 4 and the dense phase baffle plate 5, and a placement manner thereof, which are described in detail below.

Figure 9:
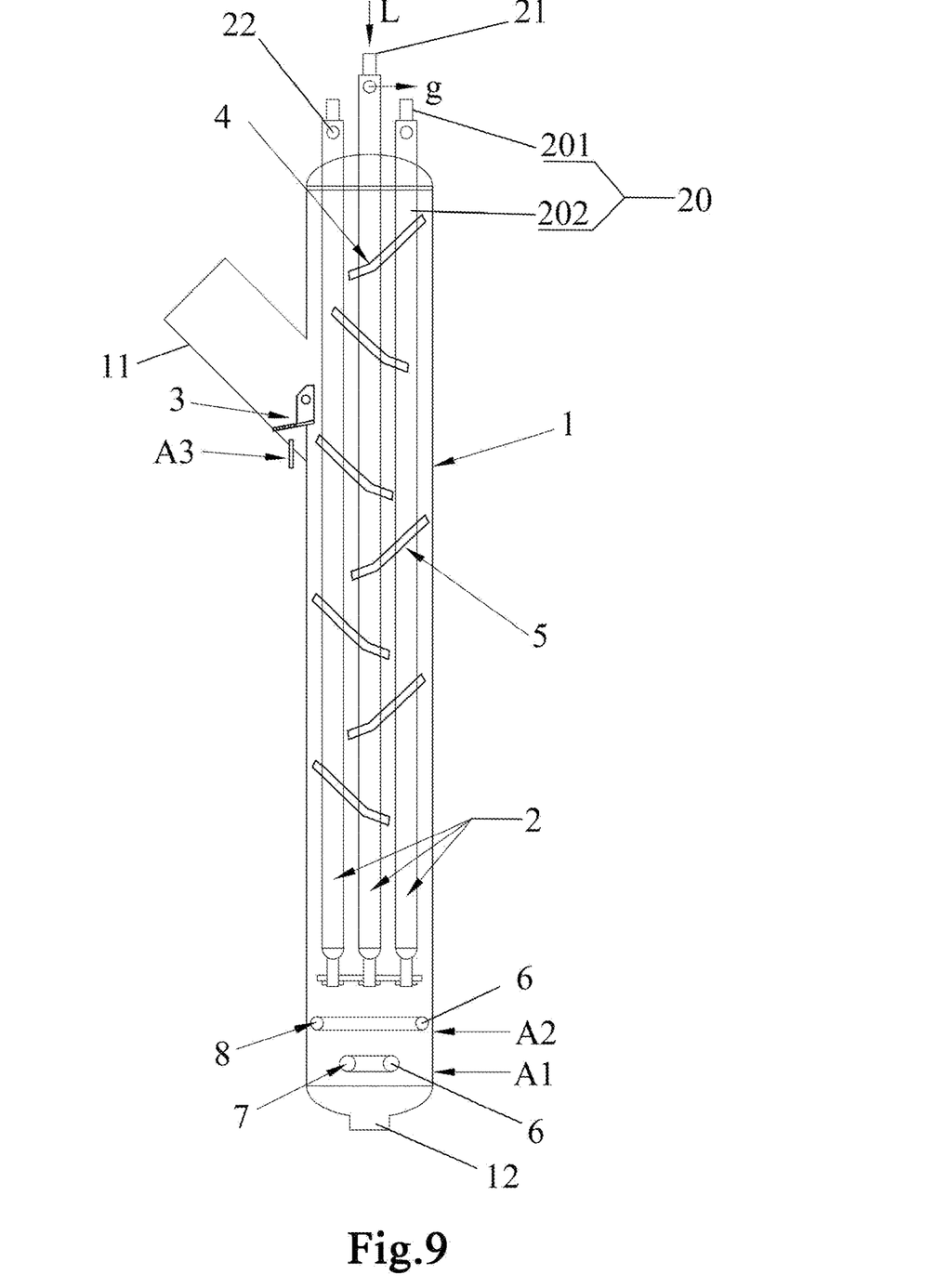
FIG. 9 is a structural diagram of a fluidized bed cooler with regional coordination enhancement provided by Embodiment 2 of the present disclosure.

With reference to FIG. 9, both the dilute phase baffle plate 4 and the dense phase baffle plate 5 are bent plates in structure, with longitudinal sections thereof being fold-line shaped, i.e., both the dilute phase baffle plate 4 and the dense phase baffle plate 5 are fold-line shaped bent plates. The dilute phase baffle plate 4 is provided thereon with a plurality of dilute phase baffle plate guide holes 40, and in the dilute phase region M, the plurality of dilute phase baffle plates 4 are spirally arranged from bottom to top around the longitudinal centerline of the shell 1 or arranged in a staggered manner from bottom to top along the longitudinal centerline of the shell 1. The dense phase baffle plate 5 is provided thereon with a plurality of dense phase baffle plate guide holes 50, and the plurality of dense phase baffle plates 5 are spirally arranged from bottom to top around the longitudinal centerline of the shell 1 in the dense phase region N or arranged in a staggered manner from bottom to top along the longitudinal centerline of the shell 1.

Figure 10A:
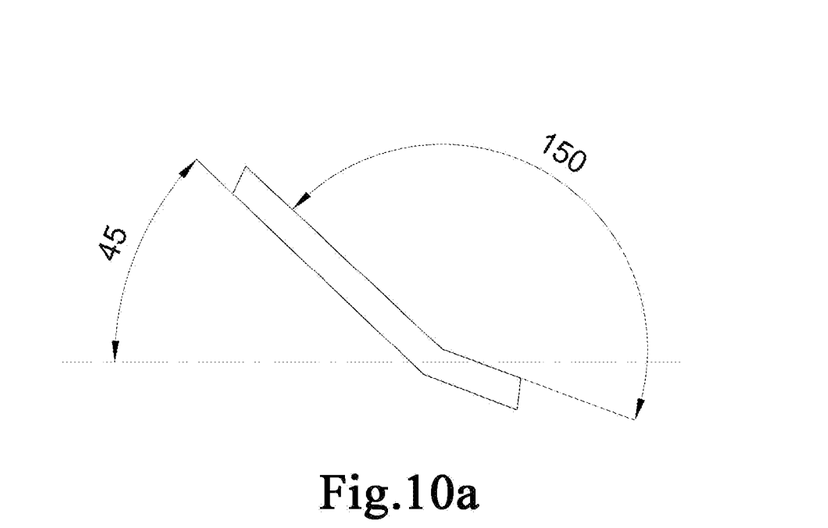
FIG. 10a is a side view of a fold-line shaped bent plate.
Figure 10B:
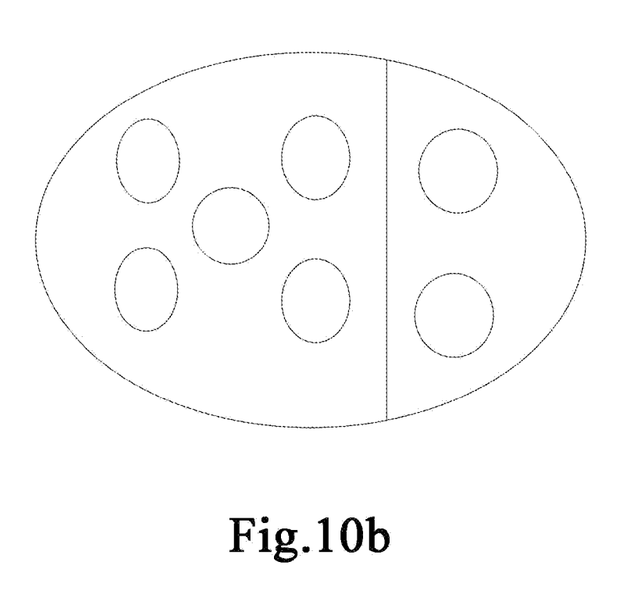
FIG. 10b is a top view of a fold-line shaped bent plate.

Specifically, with reference to FIG. 10a, a bending angle of the fold-line shaped bent plate is 150°, and an angle with the horizontal direction is 45°. With reference to FIG. 10b, both the dilute phase baffle plate 4 and the dense phase baffle plate 5 are provided thereon with a plurality of guide holes, with an aperture ratio of 10%. The dilute phase baffle plate 4 and the dense phase baffle plate 5 are placed in the shell 1 in a manner such that a vertical distance is 1.0 m, a distance between a lowest dense phase baffle plate 5 and the annulus gas distributor 8 is 1 m, a distance between a highest dilute phase baffle plate 4 and the top portion of the shell 1 is 1.0 m. The dilute phase baffle plate 4 and the dense phase baffle plate 5 in this manner can enhance the radial mixing of the solid catalyst particles to a greatest extent, thereby increasing the total dwelling time and the renewal frequency of the solid catalyst particles. Meanwhile, the coordinated matching of the dilute phase baffle plate 4 and the dense phase baffle plate 5 with the regional particle distributor 3, the central gas distributor 7 and the annulus gas distributor 8 realizes the coordinated enhancement of the heat exchange in the plurality of regions of the fluidized bed cooler and improves the stability thereof.

Although the present disclosure has been described in detail with the general descriptions and the specific embodiments, it is obvious to those skilled in the art that some modifications or improvements can be made on the basis of the present disclosure. Therefore, these modifications or improvements made without deviating from the spirit of the present disclosure belong to the protection scope of the present disclosure.

What is claimed is:

1. A fluidized bed cooler with regional coordination enhancement, comprising a shell which is cylindrical and vertically provided, wherein a plurality of heat exchange tubes are vertically distributed in the shell, a catalyst inlet is provided at an upper portion of the shell, a catalyst outlet is provided at a bottom portion of the shell, and an interior of the shell is divided into a catalyst inlet influence region, a dilute phase region at the upper portion, a dense phase region at the lower portion and a gas distributor influence region at the bottom portion, and wherein the dilute phase region and the dense phase region are located above and below the catalyst inlet influence region, respectively, wherein a catalyst inlet inclined tube is provided obliquely upward at the catalyst inlet, and a regional particle distributor is provided at the catalyst inlet positioned in the catalyst inlet inclined tube;

wherein the regional particle distributor comprises a local gas distribution plate, a local gas pre-distributor, a left splitter partition plate and a right splitter partition plate; the local gas distribution plate is provided with a plurality of local gas distribution plate vent holes at intervals, the inner ends of the left splitter partition plate and the right splitter partition plate are fixedly connected to each other to form a partition plate included angle, the bottom portions of the left splitter partition plate and the right splitter partition plate are fixed on the local gas distribution plate, and the partition plate included angle is inside the local gas distribution plate, with outer ends of the left splitter partition plate and the right splitter partition plate extending beyond two ends of the local gas distribution plate, respectively; the local gas distribution plate is provided at a junction of the catalyst inlet inclined tube and the shell and is inclined upward towards the interior of the shell; and a lower portion of the catalyst inlet inclined tube is provided with a local fluidizing air inlet at a position directly opposite to the local gas distribution plate;

wherein the dense phase region is provided with a plurality of dense phase baffle plates, the dilute phase region is provided with a plurality of dilute phase baffle plates, both the dense phase baffle plate and the dilute phase baffle plate are provided with guide holes, and the plurality of heat exchange tubes sequentially pass through and are fixedly connected to the plurality of dense phase baffle plates and the plurality of dilute phase baffle plates vertically arranged at intervals so as to form a single piece; and     wherein the gas distributor influence region is provided with double gas distributors.

2. The fluidized bed cooler with regional coordination enhancement according to claim 1, wherein the local gas distribution plate is shaped as a sector of 180°, and the plurality of local gas distribution plate vent holes on the local gas distribution plate are symmetrically distributed about a centerline of the local gas distribution plate; and     wherein the left splitter partition plate and the right splitter partition plate are both provided with a plurality of partition plate vent holes, wherein the left splitter partition plate and its partition plate vent holes as well as the right splitter partition plate and its partition plate vent holes are symmetrical about a vertical section where the centerline of the local gas distribution plate is located, respectively.

3. The fluidized bed cooler with regional coordination enhancement according to claim 2, wherein a sharp corner at a top portion of the partition plate included angle is slotted to form a middle channel for facilitating the flowing of the fluidized catalyst particles.

4. The fluidized bed cooler with regional coordination enhancement according to claim 1, wherein each of the heat exchange tubes comprises a water tube and a steam tube hermetically sleeving the water tube, a top end of each of the heat exchange tubes extends outside the shell, a water inlet is provided at a top portion of the water tube, and a steam outlet is provided at a top portion of the steam tube; and the plurality of heat exchange tubes in parallel form a heat exchange tube bundle.

5. The fluidized bed cooler with regional coordination enhancement according to claim 4, wherein the double gas distributors comprise a central gas distributor and an annulus gas distributor, both of which are annular tube structures, wherein an outer diameter of the central gas distributor is smaller than the inter diameter of the annulus gas distributor, the central gas distributor and the annulus gas distributor are provided in parallel at the bottom portion inside the shell below the heat exchange tube bundle, and the central gas distributor is located below the annulus gas distributor;

wherein each of the central gas distributor and the annulus gas distributor is provided with a fluidizing air inlet, a bottom surface of the central gas distributor is circumferentially provided with a plurality of central gas distributor vent holes at intervals, a bottom surface of the annulus gas distributor is circumferentially provided with a plurality of annulus gas distributor vent holes at intervals, the fluidizing air inlet of the central gas distributor is communicated with the plurality of central gas distributor vent holes, and the fluidizing air inlet of the annulus gas distributor is communicated with the plurality of annulus gas distributor vent holes; and     wherein a central fluidizing air inlet and an annulus fluidizing air inlet are provided on the shell at positions corresponding to the central gas distributor and the annulus gas distributor, respectively, and are communicated with the fluidizing air inlet of the central gas distributor and the fluidizing air inlet of the annulus gas distributor, respectively.

6. The fluidized bed cooler with regional coordination enhancement according to claim 5, wherein the central gas distributor vent hole is inclined towards a longitudinal centerline of the shell, so that fluidizing air from the central gas distributor vent hole flows to a center of the shell as much as possible; and     wherein the annulus gas distributor vent hole is inclined towards an inner wall of the shell, so that fluidizing air from the annulus gas distributor vent hole flows to a circumference of the inner wall of the shell as much as possible.

7. The fluidized bed cooler with regional coordination enhancement according to claim 1, wherein each dense phase baffle plate is a bent plate in structure with a fold-line shaped or arc-shaped longitudinal section, and provided with a plurality of dense phase baffle plate guide holes; and     wherein in the dense phase region, the plurality of dense phase baffle plates are spirally arranged from bottom to top around a longitudinal centerline of the shell or arranged in a staggered manner from bottom to top along the longitudinal centerline of the shell.

8. The fluidized bed cooler with regional coordination enhancement according to claim 1, wherein the dilute phase baffle plate is a cone frustum in structure, comprising an upper frustum circular hole, a lower frustum circular hole and a frustum body, the upper frustum circular hole and the lower frustum circular hole are connected through the frustum body, and the frustum body is provided with a plurality of dilute phase baffle plate guide holes; and     wherein the plurality of dilute phase baffle plates are located in the dilute phase region, centerlines of the dilute phase baffle plates are coincided with a longitudinal centerline of the shell, and one of adjacent dilute phase baffle plates is arranged upside-down with respect to the other of the adjacent dilute phase baffle plates along the longitudinal centerline of the shell so that the upper frustum circular hole and the lower frustum circular holes of the adjacent dilute phase baffle plates are arranged in a staggered manner.

9. The fluidized bed cooler with regional coordination enhancement according to claim 1, wherein the dilute phase baffle plate is a bent plate in structure with a fold-line shaped or arc-shaped longitudinal section, and provided with a plurality of dilute phase baffle plate guide holes; and wherein in the dilute phase region, the plurality of dilute phase baffle plates are spirally arranged from bottom to top around a longitudinal centerline of the shell or arranged in a staggered manner from bottom to top along the longitudinal centerline of the shell.

10. The fluidized bed cooler with regional coordination enhancement according to claim 1, wherein the local gas distribution plate is provided in an angle greater than 0° and less than or equal to 30° relative to the horizontal direction.

11. The fluidized bed cooler with regional coordination enhancement according to claim 1, wherein the local gas distribution plate has an aperture ratio of 1% to 10%, and an inclination angle from a normal direction of the local gas distribution plate vent hole to the local gas distribution plate is 45° to 90°.

12. The fluidized bed cooler with regional coordination enhancement according to claim 1, wherein an included angle between the left splitter partition plate and the local gas distribution plate is 90° to 120°, and an included angle between the right splitter partition plate and the local gas distribution plate is 90° to 120°.

13. The fluidized bed cooler with regional coordination enhancement according to claim 3, wherein a slotted depth of the middle channel is a 15% to 50% of the height of the left splitter partition plate and the right splitter partition plate which have the same height.

14. The fluidized bed cooler with regional coordination enhancement according to claim 2, wherein an aperture ratio of both the left splitter partition plate and the right splitter partition plate is 0.5% to 5%.

15. The fluidized bed cooler with regional coordination enhancement according to claim 5, wherein an included angle between a normal direction of the central gas distributor vent hole and a horizontal direction is 10° to 45°, an included angle between a normal direction of the annulus gas distributor vent hole and the horizontal direction is 30° to 90°, and a vertical distance between the central gas distributor and the annulus gas distributor is 0.3 m to 1.0 m.

16. The fluidized bed cooler with regional coordination enhancement according to claim 7, wherein an angle between the dense phase baffle plate and the horizontal direction is 30° to 60°, a vertical distance between the adjacent dense phase baffle plates is 0.3 m to 1.0 m, and a vertical distance between a lowest dense phase baffle plate and the central gas distributor is 0.8 m to 1.5 m.

17. The fluidized bed cooler with regional coordination enhancement according to claim 7, wherein an aperture ratio of the dense phase baffle plate is 5% to 40%.

18. The fluidized bed cooler with regional coordination enhancement according to claim 9, wherein an aperture ratio of the dilute phase baffle plate is 5% to 40%, a vertical distance between the adjacent dilute phase baffle plates is 0.3 m to 1.0 m, and a vertical distance between a highest dilute phase baffle plate and a top portion of the shell is 0.5 m to 1.0 m.

\* \* \* \* \*